US010019415B1

(12) United States Patent
Wombell

(10) Patent No.: US 10,019,415 B1
(45) Date of Patent: Jul. 10, 2018

(54) SYSTEM AND METHOD FOR CONSISTENT CROSS-PLATFORM TEXT LAYOUT

(71) Applicant: Animoto Inc., San Francisco, CA (US)

(72) Inventor: Krister Wombell, The Nexus (SG)

(73) Assignee: Animoto Inc., San Francisco, CA (US)

( * ) Notice: Subject to any disclaimer, the term of this patent is extended or adjusted under 35 U.S.C. 154(b) by 0 days.

(21) Appl. No.: 15/177,632

(22) Filed: Jun. 9, 2016

Related U.S. Application Data

(60) Provisional application No. 62/211,212, filed on Aug. 28, 2015.

(51) Int. Cl.
*G06F 17/00* (2006.01)
*G06F 17/21* (2006.01)
*G06T 3/40* (2006.01)
*G06T 1/20* (2006.01)
*G06F 17/22* (2006.01)

(52) U.S. Cl.
CPC .......... *G06F 17/214* (2013.01); *G06F 17/212* (2013.01); *G06F 17/2247* (2013.01); *G06T 1/20* (2013.01); *G06T 3/40* (2013.01)

(58) Field of Classification Search
CPC .................................................... G06F 17/214
See application file for complete search history.

(56) References Cited

U.S. PATENT DOCUMENTS

| 8,705,139 B1* | 4/2014 | Snyder | H04N 1/387 |
| | | | 358/1.15 |
| 2003/0095135 A1* | 5/2003 | Kaasila | G06F 3/0481 |
| | | | 345/613 |
| 2004/0027369 A1 | 2/2004 | Kellock | |
| 2004/0119715 A1* | 6/2004 | Everett | G06F 17/214 |
| | | | 345/471 |
| 2007/0030272 A1* | 2/2007 | Dowling | G06T 11/203 |
| | | | 345/467 |
| 2008/0016114 A1 | 1/2008 | Beauregard | |
| 2008/0019610 A1 | 1/2008 | Matsuzaka | |
| 2009/0300480 A1 | 12/2009 | Cohen | |
| 2010/0021125 A1 | 1/2010 | Ingrosso | |
| 2010/0281383 A1 | 11/2010 | Meaney | |

(Continued)

OTHER PUBLICATIONS

Wikipedia, "Line Wrap and Word Wrap", https://en.wikipedia.org/wiki/Line_wrap_and_word_wrap, dated May 11, 2016, 7 pages.

(Continued)

*Primary Examiner* — Andrew T McIntosh
(74) *Attorney, Agent, or Firm* — Hickman Palermo Becker Bingham LLP; Adam C. Stone

(57) ABSTRACT

A system for consistent cross-platform text layout, in one embodiment, performs a computer-implemented method comprising the step of generating text layout information representing a layout of text on a scalable unit grid. The text layout information comprises glyph information for each glyph in a set of glyphs. The glyph information for each glyph in the set of glyphs comprises a) vector path information defining one or more contours of the each glyph, and b) a horizontal grid coordinate and a vertical grid coordinate identifying a location of the each glyph in the scalable unit grid. The method further includes the step of using the text layout information to render the set of glyphs in a pixel grid.

21 Claims, 7 Drawing Sheets

(56) References Cited

U.S. PATENT DOCUMENTS

| | | | |
|---|---|---|---|
| 2011/0052154 A1 | 3/2011 | Weber | |
| 2011/0119573 A1* | 5/2011 | Rudolph | G06F 17/212 |
| | | | 715/234 |
| 2012/0060095 A1 | 3/2012 | Klappert | |
| 2012/0131437 A1* | 5/2012 | Zhu | G06F 17/30905 |
| | | | 715/234 |
| 2012/0198338 A1 | 8/2012 | Flint | |
| 2013/0125000 A1 | 5/2013 | Fleischhauer | |
| 2014/0237065 A1* | 8/2014 | Kloba | G06F 17/30902 |
| | | | 709/213 |
| 2014/0320540 A1* | 10/2014 | Deach | G06T 3/40 |
| | | | 345/666 |
| 2015/0078733 A1 | 3/2015 | Popkiewicz | |
| 2015/0294687 A1 | 10/2015 | Buick | |
| 2016/0293216 A1 | 10/2016 | Tost | |
| 2017/0091558 A1 | 3/2017 | Smolic | |

OTHER PUBLICATIONS

Stupeflix, Make videos online with photos, clips, musicm, https://studio.stupeflix.com/en/, dated Jun. 8, 2016, 1 page.

Shakr—Online Video Maker, https://www.shakr.com/, dated Jun. 8, 2016, 1 page.

Paths—SVG 1.1 (Second Edition), W3C Recommendation, dated Aug. 16, 2011, https://www.w3.org/TR/SVG/paths.html#PathData, 46 pages.

Litherum: End-To-End Tour of Text Layout/Rendering, http://litherum.blogspot.com/2015/02/end-to-end-tour-of-text-rendering.html, dated Feb. 27, 2015, 9 pages.

Glyph Metrics, FreeType Glyphs Conventions/III, Baseline, Pens and Layouts, https://www.freetype.org/freetype2/docs/glyphs/glyphs-3.html, dated Dec. 7, 2014, 6 pages.

Canva, Amazingly Simple Graphic Design Software, https://www.canva.com/, dated Jun. 8, 2016, 1 page.

Adobe Spark, "Communicate with Impact", https://spark.adobe.com/,dated Jun. 8, 2016, 1 page.

Wharton, U.S. Appl. No. 15/249,276, filed Aug. 26, 2016, Office Action, dated Oct. 19, 2017.

Clifton, U.S. Appl. No. 15/249,089, filed Aug. 26, 2016, Office Action, dated Oct. 20, 2017.

* cited by examiner

SYSTEM AND METHOD FOR CONSISTENT CROSS-PLATFORM TEXT LAYOUT

RELATED APPLICATION

This application claims the benefit of U.S. Provisional Application Ser. No. 62/211,212, filed Aug. 28, 2015, entitled "DIGITAL VIDEO BUILDER SYSTEM WITH DESIGNER-CONTROLLED USER INTERACTION," which is hereby incorporated by reference herein in its entirety.

TECHNICAL FIELD

The disclosed embodiments relate generally to laying out and rendering text using a computer. More particularly, the disclosed embodiments relate to a system and method for laying out text consistently across different computing platforms.

BACKGROUND

Today, online services exist for creating a custom product that incorporates text provided by a user. The text may be, for example, a slogan, message, saying, title, quote, or other string of characters that is rendered in or on the custom product. With some online services, the custom product that can be created is a digital product such as, for example, a digital video, digital image, or document in which the text appears. With other online services, the custom product that can be created is a physical product such as, for example, clothing (e.g., a t-shirt, a hat, etc.) or other physical article (e.g., a coffee mug, a calendar, a wedding invitation, etc.) on which the text is printed.

Typically, the user provides the text to be rendered in or on the custom product from his or her personal computing device. To render the text in or on the custom product, the text is typically sent over a network from the user's personal computing device to a server operated by the online service. The server may also generate and return to the personal computing device a preview of the custom product that visually depicts how the text will appear when eventually rendered in or on the custom product. The visual preview may be in the form of a digital video, a digital image, or a web page, for example. However, the user may wish to experiment with different text, different text placements, and different font faces before deciding on a final text configuration for the custom product. In this case, for each experimental configuration, the user may have to wait for the text to be transmitted to the server over the network, the server to generate the preview, and the preview to be returned to and viewed at the user's personal computing device before the user can decide if the configuration is suitable. This waiting may be frustrating or cumbersome for the user and may limit the overall usability of the online service.

An alternative approach is to generate the preview at the user's personal computing device using text layout and rendering services provided by a user agent. The user agent may be, for example, a web browser application that performs text layout and rendering operations, possibly supported by an underlying operating system, on given text. In this case, the text may still be sent to the server for rendering in or on the custom product. However, due to differences in how different user agents lay out text, this alternative approach may not provide a "what you see is what you get (WYSIWYG)" user experience. Instead, the text as presented in the preview may appear noticeably different than the text as rendered in or on the custom product. Unfortunately, in some cases, the user may not notice this until after the user has paid for and received the custom product.

DESCRIPTION OF EMBODIMENTS

In the following description, for the purposes of explanation, numerous specific details are set forth in order to provide a thorough understanding of embodiments the present invention. It will be apparent, however, that the embodiments may be practiced without these specific details. In other instances, well-known structures and devices are shown in block diagram form in order to avoid unnecessarily obscuring the embodiments.

General Overview

According to some embodiments of the present invention, a system and method for consistent cross-platform text layout in a networked client/server environment preferably uses a client-side text layout engine to lay out text input by a user on a scalable unit grid. The client-side layout engine also preferably generates scalable text layout information reflecting the layout of the text on the scalable unit grid. In practice, the system and method may be implemented within an online service platform for designing and generating a target custom product. The generated scalable text layout information is preferably provided to a client-side text rendering engine for rendering the text in a visual preview of a target custom product that shows how the text will look when rendered in or on the target custom product. The scalable text layout information is also preferably provided over a network to a server-side text rendering engine for actually rendering the text in or on the target custom product.

Because the client-side text rendering engine and the server-side text rendering engine use the same scalable text layout information generated by the client-side text layout engine, the layout of the text as it appears in the visual preview is consistent with the text as rendered in or on the custom product with respect to text layout aspects that can ordinarily differ across different user agents. The system and method function to facilitate a more consistent cross-platform "what you see is what you get (WYSIWYG)" custom product design and generation experience in which the visual preview of the target custom product is rendered on the client-side and is more representative of the appearance of final custom product received by the user, when compared to approaches that use the text layout engine of an underlying user agent to lay out the text for the preview. The system and method is necessarily rooted in computer technology that addresses a problem arising in the technical realm of laying out and rendering text across different computing platforms in a consistent manner.

Example System

Figure 1:
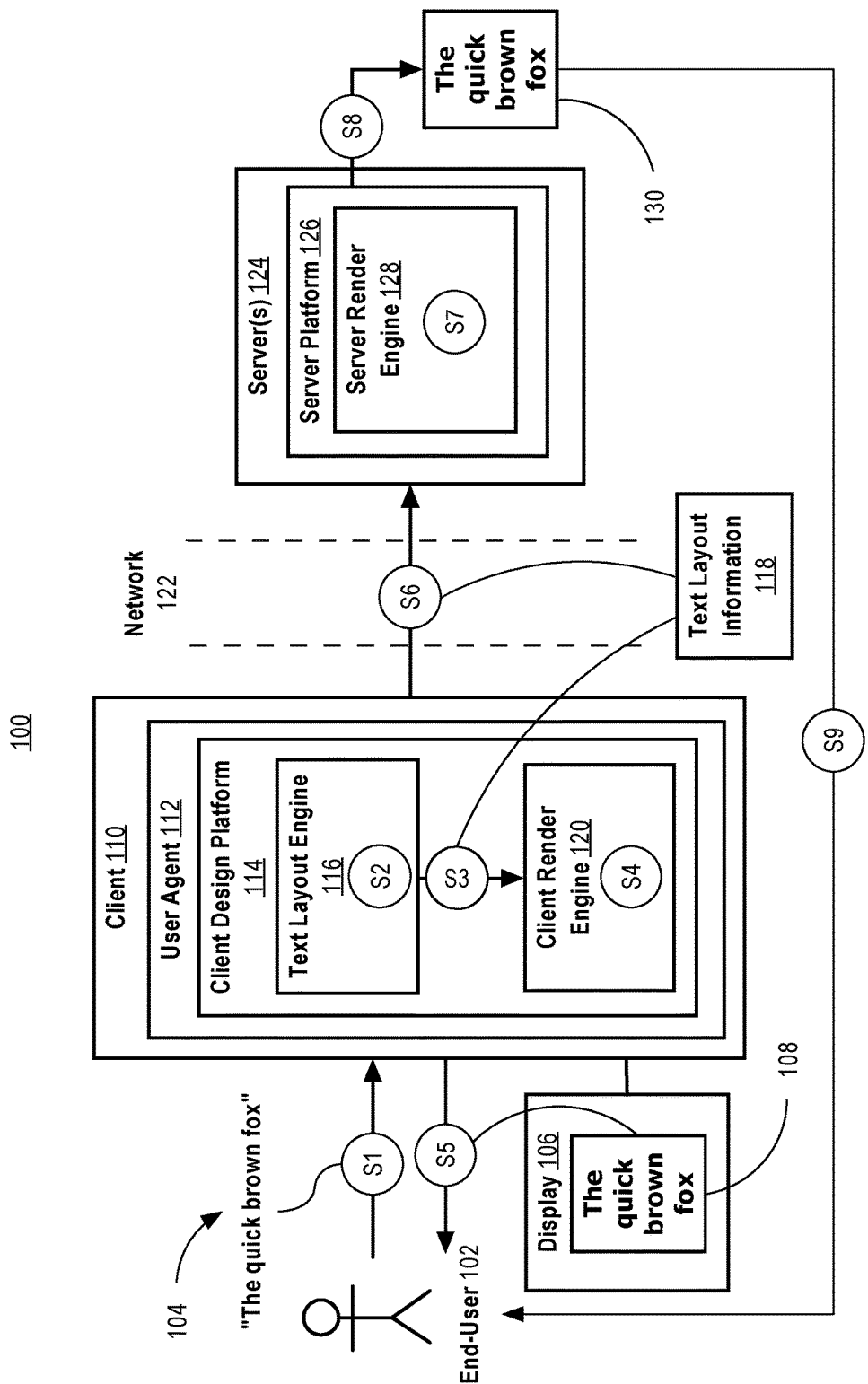
FIG. 1 is a schematic representation of an example client-server system for consistent cross-platform text layout.

As shown in FIG. 1, as an example, a consistent cross-platform text layout system 100 can include an end-user 102 (or just "the user 102") that uses a client computing device 110 (or just "the client 110") that interacts with one or more server computing devices 120 (or just "the server(s) 124") over a network 122.

Figure 6:
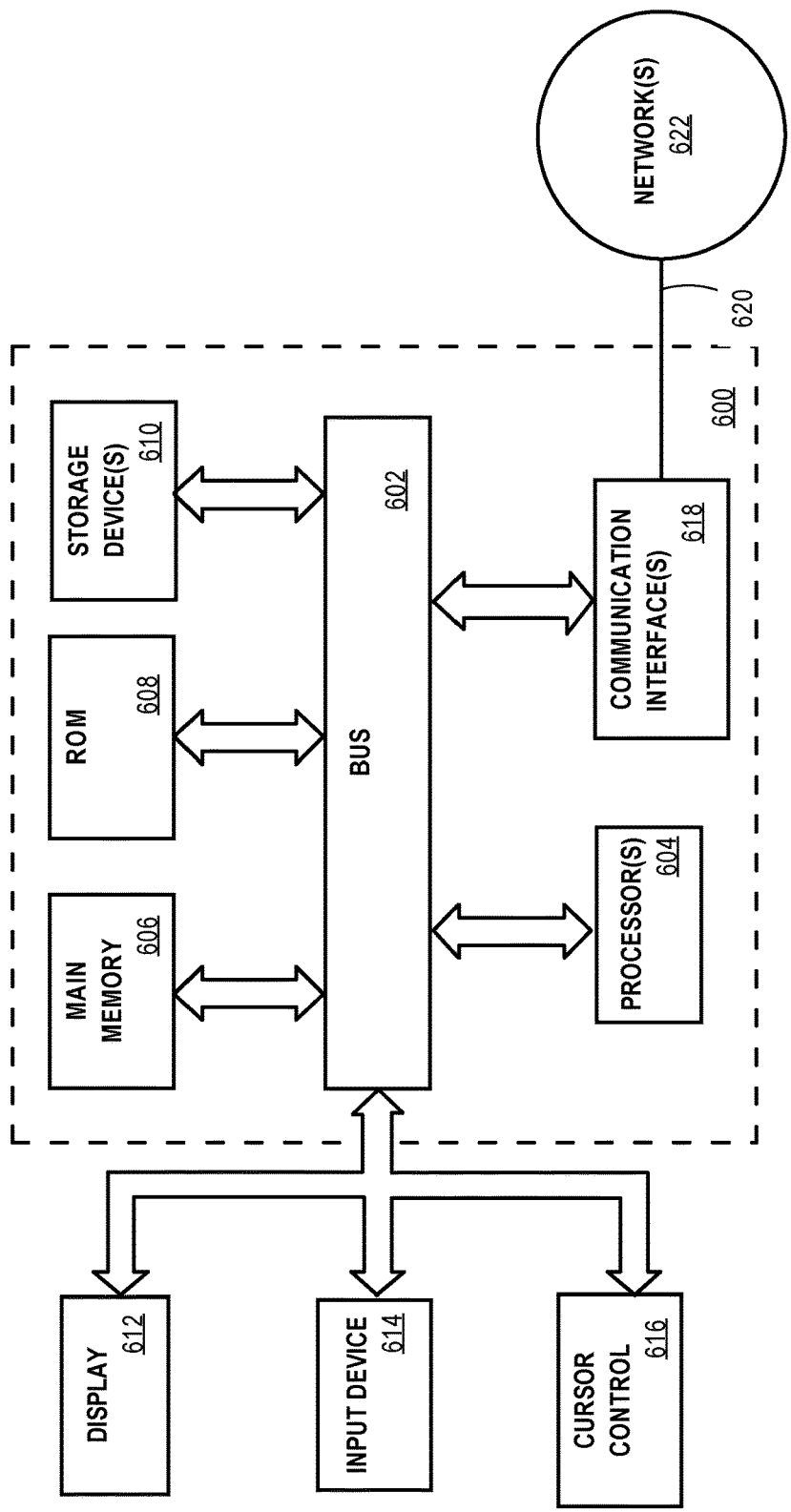
FIG. 6 is a schematic representation of basic computer hardware in which or with which some embodiments of the present invention may be embodied or implemented.

The client 110 and each of the server(s) 124 may each be implemented by basic computer hardware such as basic computer hardware 600 described herein with respect to FIG. 6. The client 110 and each of the server(s) 124 may each be configured with a basic software system such as basic software system 400 described herein with respect to FIG. 400.

The network 122 may comprise one or more interconnected data networks that support end-to-end Internet Protocol (IP) communications between the client and the server(s). Interaction between the client 110 and the servers(s) 124 over the network 122 may occur according to one or more higher-level networking protocols such as, for example, one or more of the Transmission Control Protocol (TCP), the User Datagram Protocol (UDP), the Hypertext Transfer Protocol (HTTP), the Transport Layer Security (TLS) protocol, the Secure Sockets Layer (SSL) protocol, or other Internet protocols.

The client 110 may be configured with a user agent 112. The user agent 112 may host (execute) a custom product end-user design platform 114 (or just "the client design platform 114").

In some configurations, the underlying user agent 112 encompasses a web browser application executing on an operating system. The web browser application may be used for retrieving, presenting, and traversing web pages. In these configurations, the client design platform 114 may be implemented, at least in part, by JAVASCRIPT programming language instructions and/or other browser-executable instructions (e.g., JAVA, VBSCRIPT, ACTIONSCRIPT, Hyper-Text Markup Language (HTML), Cascading Style Sheet (CS S) language, etc.) for which the web browser application on the operating system can operate as a host for (execute) the instructions that implement the client design platform 114.

In some configurations, the underlying user agent 112 encompasses an operating system such as, for example, operating system 410 described herein with respect to FIG. 410, without encompassing a web browser application. In these configurations, the client design platform 114 may be implemented by programming language instructions for which the operating system can operate as a host for (execute) the instructions that implement the client design platform 114.

In either configuration, the user agent 112 may implement its own text layout and rendering functions. The layout of text by the user agent 112 may encompass the selection of character images (referred to as "glyphs") that represent the text. The layout of text by the user agent 112 may also encompass a position in a layout grid for each of the selected glyphs.

However, in general, different user agents may lay out the same text differently under the same or similar text layout conditions. For example, different user agents may lay out the same text, in the same font face, and constrained by the same layout boundaries differently. For example, different user agents may make different shaping decisions when laying out the same text under the same or similar layout conditions. As a result, text laid out and rendered by one user agent may appear noticeably different than the same text as laid out and rendered by a different user agent. Thus, in general, the text layout and rendering services provided by the user agent 112 cannot be relied upon for consistent cross-platform text layout and rendering.

According to some embodiments of the present invention, the cross-platform text layout inconsistencies of different user agents are overcome to generate a visual preview 108 at the client 110 of a target custom product 130 in which the layout of user-provided text 104 in the visual preview 108 is more consistent with the layout of the text 104 as rendered in or on the target custom product 130 than might otherwise be if the text layout engine of the underlying user agent 112 were used in laying out the text 104 for the visual preview 108.

In operation, according to some embodiments of the present invention, the user 102 uses the client design platform 114 at the client 110 to design the target custom product 130. The user 102 may also request the client design platform 114 to generate and present the visual preview 108 of the target custom product 130 as currently designed by the user 102. If the user 102 is satisfied with the preview 108, the user 102 may also use the client design platform 114 to request the server platform 126 supported on the server(s) 124 to generate the target custom product 130 as designed.

According to some embodiments of the present invention, the text 104 the user 102 provides as part of designing the target custom product 130 may be laid out by the client design platform 114 and scalable text layout information 118 representing the results of text layout decisions by the client design platform 114 may be provided to both a client-side text rendering engine 120 at the client 110 and a server-side text rendering engine 128 at the server(s) 124 so that the server-side text rendering engine 128 can render the text 104 in or on the target custom product 130 in a layout that is consistent with the layout of the text 104 in the preview 108.

The target custom product 130 generated according to some embodiments of the present invention may take a digital form or a physical form depending on the types of custom products available for design and purchase from the online service platform.

If a digital form, the custom product 130 can be a digital image, a digital video, or a digital document such as a word processing document, a spreadsheet document, a presentation document, an electronic message (e-mail), or other type of digital document. If a digital image, the image data may assume a digital image data format such as a Joint Photographic Experts Group (JPEG) format, a Graphics Interchange Format (GIF) format, a Portable Network Graphics (PNG) format, a Tagged Image File Format (TIFF), etc. If a digital video, the video data may assume a digital video data format such as a Moving Pictures Experts Group-4 (MP4) format, an Audio Video Interleave (AVI) format, a Quick-Time format (MOV), etc. If a digital document, the document data may be associated with a Multipurpose Internet Mail Extensions (MIME) content-type that designates the type of the document data content.

If a physical product, the target custom product 130 can be virtually any physical product on which the text 104 can be printed using a computer and a digital printer that prints the text 104 or a digital image that incorporates the text 104 on a physical substrate. Depending on the capabilities of the digital printer, the physical substrate can be, but is not limited to, a flat or curved surface of an article of clothing such as a surface of a t-shirt, jacket, or hat, or a surface of another type of physical article such as a surface of a coffee mug, a paper wedding invitation, a paper calendar, etc.

The preview 108 of the target custom product 130 may be provided to the user 102 in a digital form regardless of whether the target custom product 130 is digital or physical. For example, the preview 108 may take the form of a digital image or a digital video. In this way, the preview 108 may be presented to the user 102 at the client 110 on a video screen 106. For example, if the target custom product 130 is a custom digital video, then the preview 108 may be a digital image representing a key frame of the custom digital video, or the preview 108 may be a digital video representing a series of key frames of the custom digital video. If the target custom product 130 is a custom physical article, then the preview 108 may be a digital image or a digital video simulating the custom physical article to be delivered to the user 102 or according to the user's 102 current design configuration. For example, if the custom product 130 is a custom t-shirt, then the preview 108 may be a digital image or digital photo of the custom t-shirt to be delivered to the user 102 or as currently designed by the user 102 using the client design platform 114.

Design of the target custom product 130 by the user 102 using the client design platform 114 may include the user 102 selecting the text 104 to be rendered in or on the target custom product 130. The text 104 may be slogan, saying, quote, statement, or other sequence of characters the user 102 desires to have displayed in or printed on the target custom product 130. For example, depending on the type of the target custom product 130, the user 102 may use the client design platform 114 to design a scene of an animated digital music video in which the text 104 "The quick brown fox" will appear in the scene, perhaps animated to the beat of the music. As another example, if the target custom product 130 is a physical article such as a t-shirt or other article of clothing, the user 102 may use the client design platform 114 to design how the t-shirt will look including where on the t-shirt selected text 104 (e.g., "The quick brown fox") will be printed (e.g., the front, the back, the sleeve, etc.).

Design of the target custom product 130 by the user 102 using the client design platform 114 may include the user 102 selecting a digital font face for the selected text 104. The font face may encompass a collection of related glyphs or character images that are used at the client 110 to display or print (render) text. The glyphs of the font face may share some common properties including look, style, and serifs as decided upon a designer of the font face. For example, Palatino Regular and Palatino Italic are two font faces from the same Palatino font family.

Data defining the selected font face may be stored in a data file or other data container at the client 110. A data container (e.g. a file) containing data defining one or more font faces is referred to herein as a "digital font." For each font face defined by a digital font, the digital font may contain information about the character images, character metrics, and other information for laying out and rendering text characters in the font face. Often, this information is used by a text layout engine of a user agent (e.g., 112) for laying out and rendering text (e.g., on web pages). However, according to some embodiments of the present invention, for cross-platform consistency, the client design platform 114 uses digital font information to lay out the user-provided text 104 instead of relying on the underlying user agent 112 to lay out the text 104.

As mentioned, a character image of a font face may be referred to as a "glyph." Depending on the written script, usage, or context, a single text character may correspond to several glyphs of a font face. Conversely, multiple text characters may be represented by a single glyph. For example, the Roman ligatures "fi" and "fl" may each correspond to a single glyph in a font face. More generally, the relationship between text characters and glyphs can be complicated and may vary depending on the digital font format being used and the shaping decisions made when laying out text.

As indicated previously, different user agents may make different text layout decisions for the same text under the same or similar text layout conditions. These differences can result from if and how the different user agents implement complex text layout functions such as bi-directional text processing and context-sensitive shaping. Bi-directional text processing refers to whether text is laid out left-to-right (LTR) (e.g., for English script) or right-to-left (RTL) (e.g., for Arabic script). Shaping refers to context-sensitive updates to an initial glyph sequence generated for text. The shaping of an initial glyph sequence may include rearrangement, contextual updates, ligatures, non-contextual updates, and insertion. Rearrangement may encompass changing the ordering of glyphs in the sequence without adding or removing glyphs from the sequence. For example, in some written scripts, some vowels may be written before a consonant it logically follows. In this case, rearrangement may involve changing an initial ordering of glyphs such that the glyph for a vowel is ordered before the glyph for the consonant in a new ordering of the glyphs. Contextual updates may encompass replacing a sequence of glyphs with another sequence of glyphs. Ligatures may encompass replacing a sequence of glyphs with a single glyph. Non-contextual updates may encompass replacing a single glyph with a different single glyph. Insertion may encompass inserting a new glyph into the initial sequence. Other shaping updates can be performed such as moving or relocating a glyph, kerning adjustments, connecting adjacent glyphs, placing a diacritic on top of a glyph, a ligature, or other diacritic, contextual positioning, aesthetic glyph substitution, etc. Some digital font formats include shaping instructions. However, the shaping instructions may vary between digital font formats. Furthermore, different user agents may follow or interpret shaping instructions differently. The overall result is that the text layout engine of the underlying user agent 112 cannot be relied on to provide consistent cross-platform text layout.

Design of the target custom product 130 by the user 102 using the client design platform 114 according to some embodiments of the present invention may include the user 102 selecting a font size for the selected text 104. The font size may be measured in points, rather than in device pixels or other device-specific measurement. A point may be a physical unit, and typically represents a vertical size of the font. For example, a point may be equal to $\frac{1}{72}^{nd}$ of an inch. The font pixel size in a pixel grid that corresponds to the selected font point size may vary depending on the resolution of the pixel grid, typically expressed in pixels per inch (PPI). Further, the resolution of the pixel grid may be differ in the horizontal and vertical directions. Thus, while the font point size is typically just a vertical measurement, the font pixel size has both has a horizontal magnitude and a vertical magnitude.

According to some embodiments, the font pixel size in the horizontal and vertical directions may be expressed a function of the font size by the following formulas:

$$pixel\_size_{horiz} = point\_size * PPI_{horiz}/72$$

$$pixel\_size_{vert} = point\_size * PPI_{vert}/72$$

Here, point_size is the selected font point size. $PPI_{horiz}$ is the pixels per inch in the horizontal direction of the pixel grid in which the text 104 is rendered. $PPI_{vert}$ is the pixels per inch in the vertical direction of the pixel grid in which the text 104 is rendered. When rendering the preview 108 at the client 110, the resolution of the pixel grid may reflect the resolution of the user's 102 video display screen 106 according to a current graphics mode resolution setting. When rendering the selected text 104 in or on the target custom product 130 on the server-side, the resolution of the pixel grid may reflect a target resolution for the server-side rendering of the text 104 in or on the target custom product 130. For example, the target resolution may be 360p, 720p, or 1080p if the target custom product 130 is a digital video.

According to some embodiments of the present invention, the client design platform may lay out the text 104 on a scalable unit grid and the scalable text layout information 118 provided to both the client-side text rendering engine 120 and the server-side text rendering engine 128 reflects the layout of the text 104 on the scalable unit grid. By doing so, the text 104 can be rendered at different resolutions on the client-side and the server-side while maintaining text layout consistency across the client and server platforms.

Design of the target custom product 130 by the user 102 using the client design platform 114 according to some embodiments of the present invention may include the user 102 selecting a text layout rectangle that constrains the space in which the text 104 is laid out. For example, using a pointing device (e.g., a mouse) or one or more touch gestures directed to a touch sensitive surface, the user 102 may select the location and size of the text layout rectangle relative to a containing layout rectangle.

The containing rectangle may represent the maximum space available for rendering the text 104 provided by the user 102 in or on the target custom product 130. For example, the containing rectangle may represent an available area of digital video frame or a digital image where the text 104 can appear, or represent an available area of a physical article (e.g., the front of a t-shirt) where the text 104 can be printed.

The location and size of the text layout rectangle represents the user's 102 selection of where within the available area represented by the containing rectangle that the text 104 will actually appear when rendered in or on the target custom product 130. The location and size of the text layout rectangle is may be expressed in pixel grid units. The resolution of the pixel grid may vary depending on the screen resolution of the user's 102 display 106 and current graphics mode resolution setting. The location of the text layout rectangle may be expressed as a pixel grid position of a corner of the text layout rectangle. For example, the location of the text layout rectangle may be expressed as an "X-axis" position along a horizontal axis of the pixel grid and a "Y-axis" position along a vertical axis of the pixel grid of the top-left or other corner of the text layout rectangle.

The X-axis position and Y-axis position may be expressed in pixel grid units relative to a point along the boundary of the containing rectangle (e.g., the top-left corner of the containing rectangle) or may be expressed in pixel grid units as an absolute position within the pixel grid (e.g., relative to the origin point of the pixel grid). The size of the text layout rectangle may be expressed as a width and height of the text layout rectangle in pixel grid units.

Design of the target custom product 130 by the user 102 using the client design platform 114 according to some embodiments of the present invention may include the user 102 selecting an alignment for the text 104. For example, the user 102 may select a horizontal alignment for the text 104 within the text layout rectangle such as left-aligned, centered, right-aligned, or justified. Selecting the text alignment may also include the user 102 selecting a vertical alignment for the text 104 within the text layout rectangle such as top, center, or bottom.

Design of the custom product by the user 102 using the client design platform 114 according to some embodiments of the present invention may include the user 102 selecting a color for the selected text 104. For example, the user 102 may select a Red-Green-Blue (RGB) value, or select a color from a predefined list of colors, or select a color from a color wheel, etc. The text 104 when presented in the preview 108 and when rendered in or on the target custom product 130 may be presented and rendered in the selected color.

According to some embodiments of the present invention, one or more of the font face for the text 104, the font size of the text 104, the position of the text layout rectangle, the size of the text layout rectangle, the text alignment, and the text color are predefined and the user 102 is not provided the option by the client design platform 114 to change one or more of these text formatting factors. This constraint may be imposed on the user 102 for a variety of reasons including, for example, constraints in the server-side when rendering the text 104 in or on the target custom product 130, to prevent the user 102 for making a visually unappealing design choice, or to avoid overwhelming the user 102 with design options.

Example Overall Process

An example of the overall process for consistent cross-platform text layout in the context of a user designing a custom product that incorporates text provided by the user according to some embodiments of the present invention will now be described. The example process is described in the context example system 100 discussed above. The example process encompasses general operations S1 through S9 depicted in FIG. 1. While in some cases an operation S1-S9 may be performed only after another operation S1-S9 has completed, the labels S1-S9 are merely used to identify different operations and no execution order for the operations is intended to be implied by the labels.

At operation S1, the user 102 provides input to the client design platform 114. The input may include the text 104 to be rendered in or on the target custom product 130 as well as other input described below. The client design platform 114 may present and drive a graphical user interface (GUI) via the user agent 112 on the user's 102 display 106 for prompting for input from the user 102 and for receiving the input from the user 102.

The text 104 input by the user 102 as part of operation S1 may be received by the client design platform 114 as a sequence of characters. For example, the user 102 may select the sequence of characters via a hard or software keyboard of the client 110, or using another suitable character input mechanism (e.g., speech-to-text conversation).

According to some embodiments of the present invention, the sequence of characters is represented by a sequence of UNICODE code points, with each code point in the sequence identifying a character in the UNICODE character set. The sequence of code points may be encoded according to a character encoding scheme (e.g., UTF-8, UTF-16, UTF-32, etc.) as a sequence of bytes received by the client design platform 114. However, coded character sets other than UNICODE may be used where the digital font used is capable of mapping code points in the coded character set (or encodings thereof) to glyph indices in the digital font.

As part of operation S1, the user 102 may also provide input selecting a digital font face of a digital font. For example, the GUI may present a drop down list, other list of selectable GUI items, or a combination of GUI controls (e.g., drop down lists and buttons) by which the user can select a particular digital font face from a plurality of digital font face options. In some configurations, a default digital font face is selected by the client design platform 114 and the user 102 is not provided with GUI controls by the client design platform 114 for selecting a different digital font face.

As part of operation S1, the user 102 may provide input selecting a font size. For example, the GUI may present a drop down list or other GUI controls by which the user can select a particular font size from a plurality of font size options. In some configurations, a default font size is selected by the client design platform 114 and the user 102 is not provided with GUI controls by the client design platform 114 for selecting a different font size.

As part of operation S1, the user 102 may provide input selecting the position and size of a text layout rectangle. For example, the user 102 may use a pointing device (e.g., a mouse) or one or more touch gestures directed to a touch sensitive surface to select the position and size of the text layout rectangle. In some configurations, a default position and size of the text layout rectangle is selected by the client design platform 114 and the user 102 is not provided with GUI controls by the client design platform 114 for selecting a different location and size. In some configurations, the client design platform 114 provides the user 102 with GUI controls for selecting the location of the text layout rectangle but not with GUI controls for changing the default size of the text layout rectangle. In some configurations, the client design platform 114 provides the user 102 with GUI controls for selecting the size of the text layout rectangle but not with GUI controls for changing the default location of the text layout rectangle. In configurations where the location of the layout rectangle is selectable by the user 102, the client design platform 114 may provide the user 102 with GUI controls for selecting one of a plurality of predetermined locations for the text layout rectangle. Alternatively, the GUI controls may allow the user 102 to select any point within a bounded area for the location. In configurations where the size of the layout rectangle is selectable by the user 102, the selectable size may have a minimum selectable length and a minimum selectable height that constrains how small the size of the text layout rectangle can be. Similarly, the selectable size may have a maximum selectable length and a maximum selectable height that constrains how large the size of the text layout rectangle can be.

As part of operation S1, the user 102 may provide input selecting the alignment for the input text 104. For example, the client design platform 114 may offer GUI controls (e.g., buttons) to the user 102 for selecting the vertical and/or horizontal alignment of the text 104 within the text layout rectangle. The selectable vertical alignment positions can be, for example, top, center, or bottom, relative to the text layout rectangle. The selectable horizontal alignment positions can be, for example, left, center, right, or justified relative to the text layout rectangle. In some configurations, the client design platform 114 does not offer GUI controls for selecting the alignment for the text 104. In some configurations, the client design platform 114 offers GUI controls for selecting one of the vertical alignment or the horizontal alignment, but not the other. In configurations where the vertical alignment, the horizontal alignment, or both are not selectable by the user 102, a default selection may be made by the client design platform 114.

As part of operation S1, the user 102 may provide input that selects a color for the text 104. For example, the client design platform 114 may offer GUI controls (e.g., a drop-down list or color wheel) to the user 102 for selecting the font face color for the text 104. In some configurations, the client design platform 114 selects a default color for the text 104 and does not offer GUI controls for selecting a different color.

In addition to the above input, the user 102 may provide other input as part of operation S1. For example, the client design platform 114 may offer GUI controls to the user 102 to provide input that selects digital media (e.g., digital photos, images, video, or audio) to be incorporated into the target custom product 130. Other GUI controls may be provided for selecting a style, theme, or template for the target custom product 130 (e.g., a base t-shirt design and color, a base animated video style or theme, etc.), for generating the preview 108 (e.g., a view preview button), or for generating the target custom product 130 (e.g., an order or ship product button).

At operation S2, the text layout engine 116 of the client design platform 114 lays out the text 104 on a scalable unit grid. The layout operation S2 may be based on the sequence of coded character set (e.g., UNICODE) code points or character encodings thereof representing the text 104, the selected digital font face, and the selected location and size of the layout rectangle.

According to some embodiments, the scalable unit grid represents an area in which the text 104 will be laid out within the text layout rectangle according to the selected digital font face and the selected font size. For example, the scalable unit grid may represent the selected text layout rectangle or the area of a containing rectangle that contains the selected text layout rectangle. The scalable unit grid can be represented in computer memory of the client as a two-dimensional array or other suitable data structure. The text layout rectangle may be selected in a pixel grid that is dependent on the screen resolution of the user's 102 display 106 and the current graphics mode resolution setting. Pixel coordinates in the pixel grid may be converted to scalable grid coordinates according to the following formulas:

$$\text{scalable\_coord}_{horiz} = \text{float\_point\_factor} * \text{EM\_size} * \text{pixel\_coord}_{horiz} / \text{pixel\_size}_{horiz}$$

$$\text{scalable\_coord}_{vert} = \text{float\_point\_factor} * \text{EM\_size} * \text{pixel\_coord}_{vert} / \text{pixel\_size}_{vert}$$

Here, the $\text{pixel\_coord}_{horiz}$ and $\text{pixel\_coord}_{vert}$ are coordinates of a pixel in the pixel grid which may be relative to an origin of the pixel grid or a location of a containing rectangle that contains the text layout rectangle in the pixel grid. The EM_size is derived from the selected digital font face and is typically 1,000 EM units or 2,048 EM units depending on the size of the EM square of particular digital font format selected (e.g., TrueType, Type 1, or CFF PostScript).

In some cases, a float_point_factor is applied if the particular digital font format expresses font coordinates using floating point values. In these cases, the text layout engine 116 may convert floating point values from the digital font face to integer values that correspond to coordinates in the scalable grid. This conversion and the float_point_factor may be based on precision (i.e., the number of significant digits) of the floating point values in the digital font face. For example, if floating point values in the digital font face have two significant digits, then the float_point_factor may be one hundred (100). In this example, the text layout engine 116 may covert the floating point values in the digital font face to the integer values by multiplying them by the float_point_factor. By using integer values instead of floating point values, some issues such as rounding errors or other imprecision errors that arise because of the limitations of representing real numbers in computers are avoided when the text layout engine 116 performs mathematic operations to lay out the text 104. In the above formulas for scalable grid coordinates, pixel_size$_{horiz}$ and pixel_size$_{vert}$ may be computed based on the formulas described earlier.

As part of its output, the text layout engine 116 may produce a list of glyphs in display order. Glyphs may be represented in the list by a vectorial representation. The vectorial representation for glyphs may define glyph outlines. The outlines may be represented as a collection of paths or contours. Each contour may delimit an outer or inner region of a glyph and may be made up of line segments or Bezier arcs. Bezier arcs may be defined through control points, and can be second-order (conic) or third-order (cubic). The glyph may be scaled by scaling the control points.

According to some embodiments of the present invention, the vectorial representation for glyphs are Scalable Vector Graphics (SVG) paths that are obtained from or derived from glyph contour information for the glyphs in the digital font face. For example, the following SVG path represents the geometry of the outline of the Latin capital letter 'T' in a particular digital font face, defined in terms of SVG path elements: 'M1254 3530L1254 2988L1448 2988L1448 2863L916 2863L916 2988L1111 2988L1111 3530Z'. In this example, coordinates values in the particular digital font face are floating point values and are multiplied by a float_point_factor.

While in some embodiments, the vectorial representation for glyphs are SVG paths, the vectorial representation for glyphs are EPS vector paths or DXF vector paths in other embodiments. More generally, any vectorial representation format suitable for representing glyph contours may be used.

In some embodiments, the glyph contour information in the digital font face represents glyph contours, including line segments and Bezier curves, in a compact, binary format. For example, True Type Format (TTF) uses a compact, binary format. In these embodiments, the text layout engine 116 may perform a straightforward conversion of the line segments and Bezier curves of the glyph contour information in the digital font face to the vectorial representation (e.g., SVG paths).

The output of the text layout engine 116 may also include a scalable grid coordinate (x, y) for each glyph. The coordinate may represent a location of the glyph in the scalable unit grid. For example, the location may be the starting point for drawing the glyph using the vectorial representation. The output may also include a scalable grid coordinate for each run of the text 104 that is laid out representing the location of the end of the run.

The output of the text layout engine 116 may also include a mapping that maps each output glyph to a character in the input text 104. The output may also include a mapping for each glyph to a word of the text 104. The output may also include a mapping for each glyph to a line of the text 104. According to some embodiments, the word and line mappings are used when generating a preview 108 or the target custom product 130 in which words or lines of the text 104 are animated in a digital video.

Laying out the text 104 on the scalable unit grid may include the text layout engine 116 performing complex text layout functions. Such functions may include partitioning the text 104 into one or more lines of text. Such partitioning may be performed according to a line-breaking algorithm such as, for example, Knuth-Plass or other suitable line-breaking algorithm. The link-breaking algorithm may be script (language) dependent. That is, how algorithm partitions the text 104 into lines may depend on the script (language) of the text 104.

The text layout engine 116 may perform bidirectional processing on each line of the text 104. Bidirectional processing may be performed if it is know that the line of text 104 contains one or more right-to-left words or to determine if the line contains one or more right-to-left words. A right-to-left word may exist in the line if the script (language) of the word is Arabic, Hebrew, or other right-to-left script (language). A bidirectional text processing algorithm, such as the Unicode Bidirectional Algorithm or other suitable bidirectional text processing algorithm, may be implemented by the text layout engine 116 for this. The algorithm may partition the line into one or more runs where each run has a direction, either left-to-right or right-to-left. The algorithm may look up directions for character code points or encodings in the digital font face to determine the direction for a run of characters.

The text layout engine 116 may lay out each run of the text 104. The layout of a run may be performed in two passes. In the first pass, each character code point or character encoding of a character in the run may be mapped to a glyph index in the selected digital font face. The mapping of code points or character encodings to glyph indices may be defined in one or more tables of the selected digital font face (e.g., in a 'cmap' table).

Once the glyphs for a run have been obtained, the text layout engine 116 may determine an initial layout sequence for the glyphs. Such determination may involve determining an initial coordinate in the scalable unit grid for each glyph in the sequence. Determination of the initial glyph sequence and initial positions may complete the first pass for the run.

The second pass for the run may involve the text layout engine 116 performing shaping operations such as performing context-sensitive updates and replacements to the initial glyph sequence and locations. The glyphs updates and replacements may be defined by the selected digital font face. The particular format and tables that define these updates and replacements may vary between different digital font formats. For example, the digital font face may contain rules for the particular script (language) of the run. Rules may exist in different categories such as glyph positioning ("GPOS"), glyph substitution ("GSUB"), composition and decomposition ("ccmp"), below base substitution ("blws"), etc.

As indicated above, the output of the text layout engine 116 as a result operation S2 may be the scalable text layout information 118 including a final sequence of glyphs in display order with associated coordinates identifying positions for the glyphs in the scalable unit grid. At operation S3, this information as well as other information reflecting the layout of the text 104 on the scalable unit grid is provided to the client-side text rendering engine 120 and, at operation S6, sent over the network 122 to the server-side text rendering engine 128.

The scalable text layout information 118 may be provided to the client-side text rendering engine 120 and sent over the network 112 to the server-side text rendering engine 128 in different data formats. For example, the scalable text layout information 118 may be provided to the client-side text rendering engine 120 by passing a reference or pointer to a data structure containing the scalable text layout information 118 that is stored in memory at the client 110 from the client-side text layout engine 116 to the client-side text rendering engine 120. In contrast, the scalable text layout information 118 may be sent over the network 122 to the server-side text rendering engine 128 in a serializable data format such as, for example, JavaScript Object Notation (JSON), eXtensible Markup Language (XML), or other suitable serializable data format.

The scalable text layout information 118 may be provided to the client-side text rendering 120 and sent over the network 122 to the server-side text rendering engine 128 at different times. For example, the scalable text layout information 118 may be provided to the client-side text rendering engine 120 in response to the user 102 providing input as part of operation S1 that requests the client design platform 114 to generate the preview 108 of the target custom product 130. At a different time (e.g., later), the scalable text layout information 118 may be sent over the network 122 to the server side-text rendering engine 128 in response to the user 102 providing input as part of operation S1 that requests the client design platform 114 and the server platform 126 to generate, order, or deliver the target custom product 130.

Figure 2:
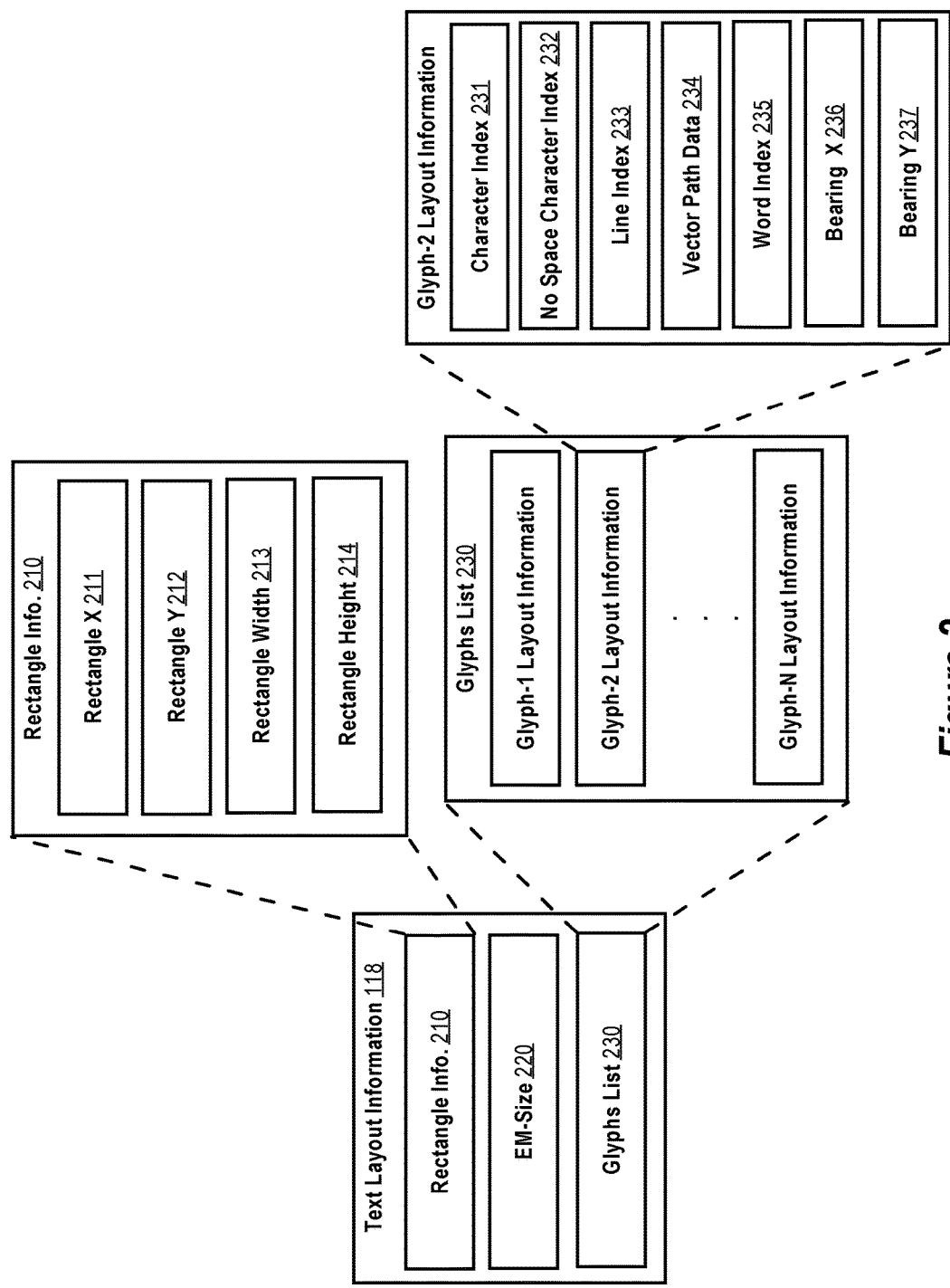
FIG. 2 is a schematic representation of text layout information according to some embodiments of the present invention.

FIG. 2 provides a schematic representation of scalable text layout information 118 that may be provided to the client-side text rendering engine 120 and sent over the network 122 to the server-side text rendering engine 128 as part of operations S3 and S6, respectively.

Preferably, the scalable text layout information 118 comprises glyph information 230 for each glyph in the sequence of glyphs determined for the text 104 by the text layout engine 116. The glyph information for each glyph may be ordered within the scalable text layout information 118 in an order that reflects the display order of the sequence of glyphs. The glyph information for each glyph preferably includes at least vector path information 234, a horizontal grid coordinate 236, and a vertical grid coordinate 237.

The vector path information 234 for a glyph may be obtained from or derived from glyph contour information associated with the glyph in the selected digital font face. Generally, the vector path information 234 represents the geometry of the outline for the glyph in the selected digital front face, defined in terms of vector path elements that set a new current pint, draw a straight line, draw a curve using a cubic Bezier, draw an elliptical or circular arc, close the current shape by drawing a line to the last set current point, etc.

The format of the glyph contour information may vary depending on the particular format of the selected digital font face. In some digital font format, there exists a 'glyf' table. The glyf table defined the contours of glyphs as a sequence of lines or Bezier curves which are laid back to font. The glyf table may also provide complex glyphs which are composed of multiple other glyphs transformed into the same coordinate space. For these digital font formats, the vector path information 234 for a glyph may be based on glyph contour information for the glyph in the glyf table. In other digital font formats, glyph contour information for glyphs is stored in a 'CFF' table.

The horizontal grid coordinate 236 for a glyph represents a point along the horizontal (x) axis of the scalable unit grid. The vertical grid coordinate 237 for the glyph represents a point along the vertical (y) axis of the scalable unit grid. Together, the coordinates 236 and 237 represent a determined layout location in the grid for the glyph. For example, the location may represent the location at which to start drawing the glyph using the vector path information 234.

In addition to the vector path information 234, a horizontal grid coordinate 236, and a vertical grid coordinate 237, the glyph information for a glyph in the text layout information 118 may include a character index 231, a no-space character index 232, a line index 233, and a word index 235. The character index 231 for a glyph identifies the character in the text 104 that glyph is an image of. The character index 231 reflects any whitespace characters that precede the identified character in the text 104. The no-space character index 232 also identifies the character in the text 104 but ignores any whitespace characters that precede the identified character in the text 104. For example, in the text "The quick brown fox", the character index 231 for the glyph depicting the letter 'q' may be 4 and the no-space character index 232 for the glyph may be 3, assuming character counting starts at zero (0). The line index 233 may identify the line of the text 104 in which the represented character appears. The word index 235 may identify the word of the text 104 in which the represented character appears.

The text layout information 118 may also include rectangle information 210 and an EM size 220. The rectangle information 210 may represent the location and size of the layout rectangle in the scalable unit grid. The Rectangle X 211 may be a point along the horizontal axis of the scalable unit grid. The Rectangle Y 212 may be a point along the vertical axis of the scalable unit grid. The Rectangle X 211 and the Rectangle Y 212 may be relative to a location (e.g., the location of the upper left corner) of the containing rectangle in the scalable unit grid, or may be an absolute point in the scalable unit grid. The Rectangle Width 213 and the Rectangle Height 214 may specify the width and height of the layout rectangle in the scalable unit grid, respectively. The Bearing X 236 and the Bearing Y 237 for each glyph may be relative to a location (e.g., the location of the upper left corner) of the layout rectangle in the scalable unit grid, or may be an absolute point in the scalable unit grid.

The EM size 220 is the size of the EM square obtained from the selected digital font face. Typically, the EM size 220 is 1,000 EM units or 2,048 EM units, depending on the particular digital font format selected. The EM size 220 may be used by the client-side text rendering engine 120 and the server-side text rendering engine 128 when scaling the vector path information 234 for the glyphs to a target rendering resolution. For example, a coordinate in the scalable unit grid can be converted to a coordinate in a target pixel grid according to the following formulas:

$$\text{pixel\_coord}_{horiz} = \text{scalable\_coord}_{horiz} * \text{pixel\_size}_{horiz} / (\text{EM\_size} * \text{float\_point\_factor})$$

$$\text{pixel\_coord}_{vert} = \text{scalable\_coord}_{vert} * \text{pixel\_size}_{vert} / (\text{EM\_size} * \text{float\_point\_factor})$$

Here, $\text{pixel\_size}_{horiz}$, $\text{pixel\_size}_{vert}$, and float_point_factor may be as described previously.

At operation S4, the client-side text rendering engine 120 uses the text layout information 118 to render the text 104 in the preview 108. The rendered text is displayed on the user's 102 display at operation S5. In some example embodiments, rendering the text layout information 118 is accomplished by the client-side text rendering engine 120 using Web GL instructions supported by an API of the user agent or other suitable two-dimensional (2D) graphics instructions supported by an API of the user agent.

At operations S7 and S8, the server-side text rendering engine 128 uses the text layout information 118 to render the text 104 in or on the target custom product 130. The custom product with the text 104 rendered in or on in is then delivered to the user 102 at operation S9. The manner of delivery may wavy depending on the form of the target custom product 130. For example, if the form of the target custom product 130 is a digital image, a digital video, or a digital document, then the target custom product 130 may be downloaded over a network by the user 102 from a server. If the form of the target custom product 130 is a physical article, then the target custom product 130 may be delivered to the user 102 by courier or post.

Use of the text layout information 118 by the client-side text rendering engine 120 to render the text 104 in the preview 108 and by the server-side text rendering engine 128 to render the text 104 in or on the target custom product 130 may involve scaling the vector path information 234 for the glyphs of the text 104 to a target pixel grid at a target pixel resolution. Scaling may include fitting the glyph contours to the target pixel grid through a hinting process. The glyph contours may then be rasterized to pixel images that can be displayed or included in or as a frame of a video or printed on a physical substrate. Other rendering operations that may be performed by the client-side text rendering engine 120 or the server-side text rendering text engine 128 include anti-aliasing and sub-pixel aliasing.

While in a preferred embodiment the digital preview 108 is rendered at the client 110 using the text layout information 118, it is also possible for the digital preview 108 to be rendered at the server(s) 124 using the text layout information 118 received from the client 110. This may be done in addition to or instead of rendering a digital preview at the client 110. For example, after receiving the text layout information 118, the server render engine 128 may use the received text layout information 118 to render the digital preview 108 (e.g., as a digital image, a digital video, or as a web page) which is then sent over the network 122 to the client 110. The digital preview 108 may then be displayed to the user 102 on the display 106.

Example Client-Side Process

Figure 3:
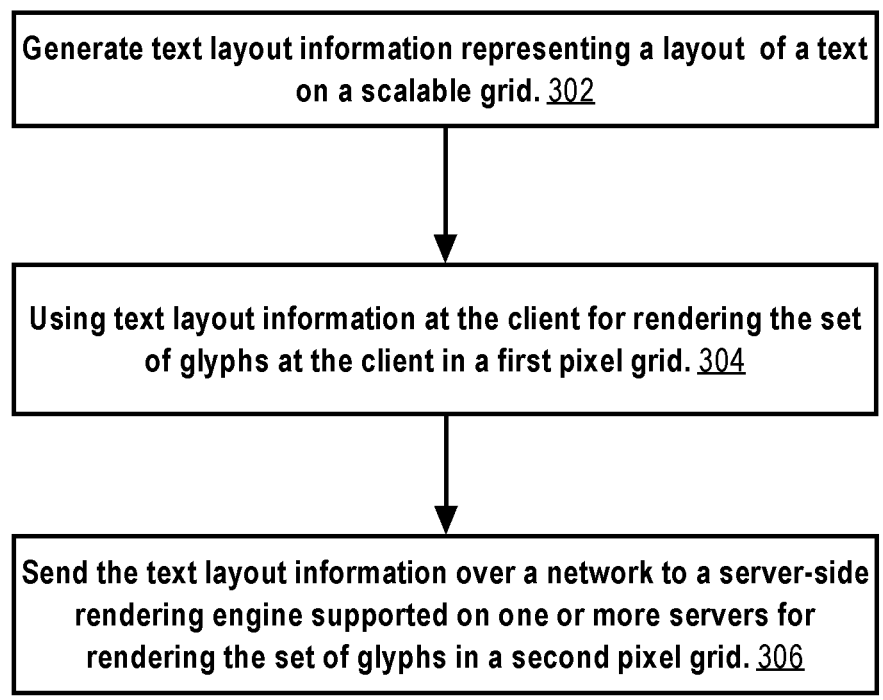
FIG. 3 is a flowchart of a client-side method for consistent cross-platform text layout, according to some embodiments of the presentation invention.

FIG. 3 is a flowchart of a client-side method 300 for consistent cross-platform text layout performed at a client, according to some embodiments of the present invention. The client generates (302) text layout information representing a layout of text on a scalable unit grid. In some embodiments, the text layout information includes glyph information for each glyph in a set of glyphs representing the character images of the text. In some embodiments, the glyph information for each glyph includes vector path information defining one or more contours of the glyph and position information identifying a layout location of the glyph on the scalable unit grid.

In some embodiments, the vector path information may define the contours of the glyph according to a vector-based graphics format such as, for example, the Scalable Vector Graphics (SVG) format. More generally, the contours of the glyph may be defined according to a set of line segments and Bezier arcs in terms of scalable unit grid units. In some embodiments, the scalable unit of the scalable unit is an EM unit or other scalable unit based on the EM size of the digital font face selected for the text.

In some embodiments, the position information for a glyph includes a horizontal grid coordinate (x-axis coordinate) and a vertical grid coordinate (y-axis coordinate) identifying a point in the scalable unit grid. The grid coordinates may be relative to another grid coordinate. For example, the grid coordinates may be relative to a grid coordinate specifying a point of a bounding box rectangle, which itself may be relative to another grid coordinate. Alternatively, the grid coordinates in the position information may be an "absolute" coordinate relative to an origin of the scalable unit grid. In some embodiments, the grid coordinates in the position information represent the starting point for drawing the glyph contours according to the corresponding vector path information for the glyph.

Figure 5:
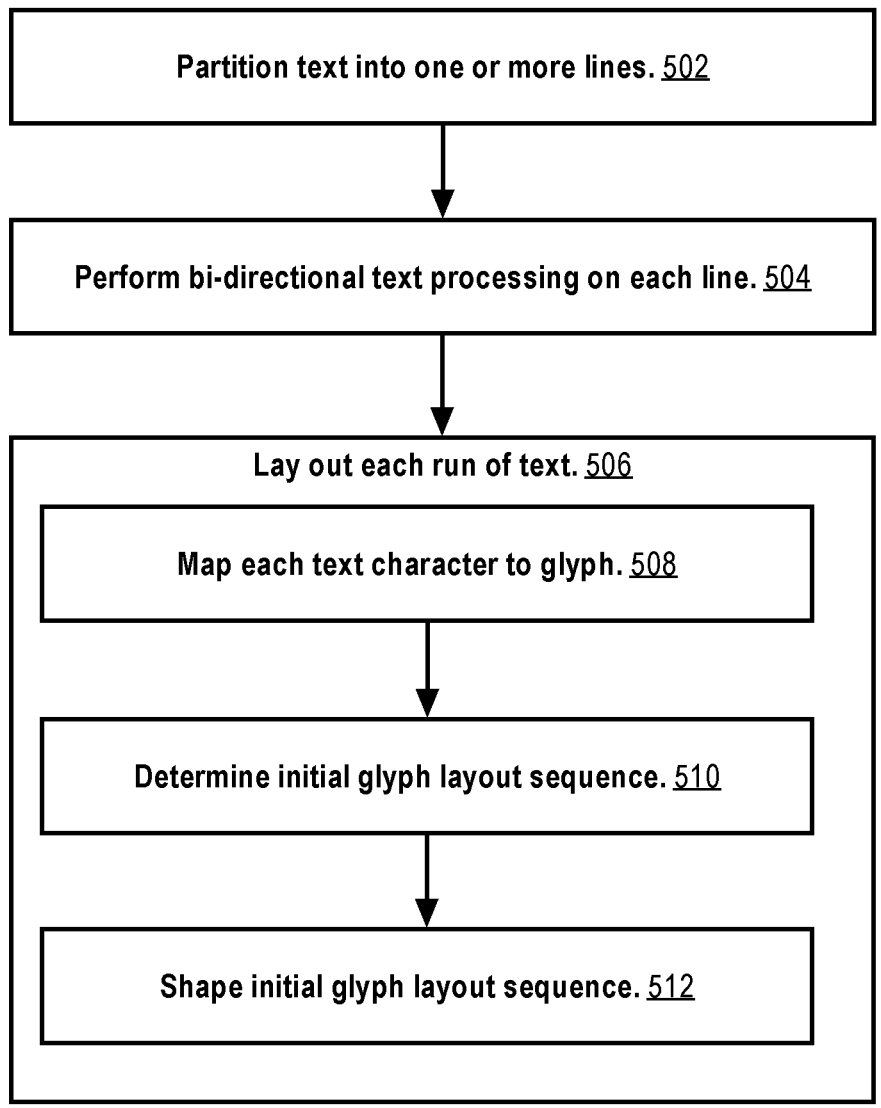
FIG. 5 is a flowchart of a method for text layout, according to some embodiments of the present invention.

FIG. 5 is a flowchart of a method 500 for laying out the text, according to some embodiments of the present invention. Method 500 may be performed as part of operation 302 of method 300, for example.

At operation 502, the text is partitioned into one or more lines according to a line-breaking algorithm. The link-breaking algorithm may be Knuth-Plass or other suitable line-breaking algorithm. The link-breaking algorithm may be script (language) dependent. That is, how algorithm partitions the text into lines may depend on the script (language) of the text.

At operation 504, bi-directional text processing is performed on each line of text. Bi-directional processing may be performed if it is know that the line of text contains one or more right-to-left words or to determine if the line contains one or more right-to-left words. A right-to-left word may exist in the line if the script (language) of the word is Arabic, Hebrew, or other right-to-left script (language). A bi-directional text processing algorithm, such as the Unicode Bidirectional Algorithm or other suitable bidirectional text processing algorithm, may be used to perform bi-directional text processing on the line. As a result of bi-directional text processing, the algorithm may partition the line into one or more runs where each run has a direction, either left-to-right or right-to-left. The bi-directional text processing algorithm may look up directions for character code points or encodings in the selected digital font face to determine the direction for a run of characters.

At operation 506, each run of text is laid out in the scalable unit grid. More specifically, each character each character code point or character encoding of a character in the run is mapped (508) to a glyph index in the selected digital font face. The mapping of code points or character encodings to glyph indices may be defined in one or more tables of the selected digital font face (e.g., in a 'cmap' table). Once the glyph indices for the run of characters have been determined, an initial layout sequence for the identified glyphs in the scalable unit grid is determined (510). This determination (510) may involve determining an initial grid coordinate in the scalable unit grid for each glyph in the sequence. The initial grid coordinate represents an initial or preliminary location for the glyph relative to the other glyphs in the sequence. Once the layout of the initial sequence of glyphs for the run is determined (510), a context-sensitive shaping operation (512) is performed on the initial layout sequence. The shaping operation (512) may include updating and replacing glyphs in the initial sequence. These updates and replacements may be defined by the selected digital font face. The particular format and tables that define these updates and replacements may vary between different digital font formats. For example, the digital font face may contain rules for a particular script (language) of the run. Rules may exist in different categories such as glyph positioning ("GPOS), glyph substitution ("GSUB"), composition and decomposition ("ccmp"), below base substitution ("blws"), etc.

Operations 508, 510, and 512 may be repeated for each run of text thereby producing a final sequence of glyphs for the text. As a result of process 500, text layout information may be generated that includes vector path information and position information for each glyph in the final sequence.

Returning to FIG. 3, the text layout information for the final sequence of glyphs is used (304) to render the set of glyphs at the client in a first pixel grid. Rendering may include scaling and rasterizing the vector path information in the text layout information according to a target resolution of the first pixel grid. In some embodiments, the first pixel grid corresponds a digital image or a key frame of a digital video that is displayed at the client to provide to a user a visual preview of a target custom product that incorporates the lay out of the text.

The text layout information is also sent (306) over a network to a server. The server uses the text layout information to render the sequence of glyphs in a second pixel grid which may have a different target resolution than the first pixel grid. Similar to at the client side, rendering at the server may include scaling and rasterizing the vector path information in the text layout information according to a target resolution of the second pixel grid. In some embodiments, the second pixel grid corresponds a digital image or a key frame of a digital video that is provided to a user as a digital download or stream. In some embodiments, the second pixel grid corresponds to a digital image or bitmap image for use by a digital printer to print the image on a physical article (e.g., paper, article of clothing, etc.). In some embodiments, the text layout information is sent (306) over the network to the server in a serialized data format such as, for example, JavaScript Object Notation (JSON) or eXtensible Markup Language (XML).

Example Server-Side Process

Figure 4:
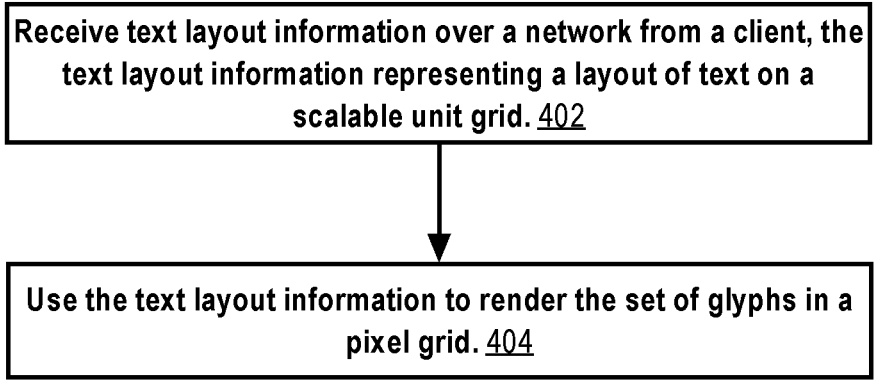
FIG. 4 is a flowchart of a server-side method for consistent cross-platform text layout, according to some embodiments of the present invention.

FIG. 4 is a flowchart of a method 400 for consistent cross-platform text layout performed at a client, according to some embodiments of the present invention. The server receives (402) the text layout information over a network from the client. The server may receive the text layout in a serialized data format such as, for example, JavaScript Object Notation (JSON) or eXtensible Markup Language (XML). The server uses (404) the text layout information to render the set of glyphs in a pixel grid. The pixel grid may correspond to a digital image that is rendered in or on a target product, for example. The target product may be a digital product such as a digital image, a digital video, or a digital document. Alternatively, the target product may be a physical article an article of clothing.

Basic Computer Hardware

Referring now to FIG. 6, it is a schematic representation of basic computer hardware 600 in which or with which the some embodiments of the present invention may be embodied or implemented. Hardware 600 and its components, including their connections, relationships, and functions, is meant to be exemplary only, and not meant to limit implementations of the some embodiments. Other computer hardware suitable for implementing the some embodiments may have different components, including components with different connections, relationships, and functions.

Hardware 600 may include a bus 602 or other communication mechanism for addressing main memory 606 and for transferring data between and among the various components of hardware 600.

Hardware 600 may also include one or more processors 604 coupled with bus 602 for processing information. A processor 604 may be a general purpose microprocessor, a system on a chip (SoC), a central processing unit (CPU), a graphics processing unit (GPU), or other computer processor.

Main memory 606, such as a random access memory (RAM) or other dynamic storage device, also may be coupled to bus 602 for storing information, data, metadata, or instructions to be executed or processed by processors 604. Main memory 606 also may be used for storing temporary variables or other intermediate information during execution of software instructions to be executed by processor(s) 604.

Software instructions, when stored in storage media accessible to processor(s) 604, render hardware 600 into a special-purpose machine that is custom to perform the functions or operations specified in the software instructions. The terms "software," "instructions," "software instructions," "computer program," "computer-executable instructions," and "processor-executable instructions" are to be broadly construed to cover any machine-readable information, whether or not human-readable, for directly or indirectly instructing a processor to perform specific operations. The machine-readable information may include, but is not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors. Machine-readable information may directly instruct a processor to perform specific functions or operations if the machine-readable information contains instructions that conform to an instruction set of the processor. Machine readable information may indirectly instruct a processor to perform specific functions or operations if the machine-readable information contains instructions that can be interpreted or compiled into instructions that conform to an instruction set of the processor.

Hardware 600 also may include read only memory (ROM) 608 or other static storage device coupled to bus 602 for storing static information and software instructions for processor(s) 604.

One or more mass storage devices 610 may be coupled to bus 602 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 stores a body of program and data for directing operation of the computing device, including an operating system, user application programs, driver and other support files, as well as other data files of all sorts.

Hardware 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch input (e.g., via a finger or stylus) to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

In some configurations, one or more of display 612, input device 614, and cursor control 616 are external components (e.g., peripheral devices) to a form factor of hardware 600. In some configurations, some or all of display 612, input device 614, and cursor control 616 are integrated as part of the form factor of hardware 600.

Functions or operations of the disclosed methods may be performed by hardware 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions or operations of the some embodiments.

While functions and operations of the some embodiments may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or instructions. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Hardware 600 also may include one or more communication interface(s) 618 coupled to bus 602. A communication interface 618 provides a two-way data communication coupling to a network 622 via a wired or wireless network link 620. Communication interface 618 sends and receives electrical, electromagnetic, or optical signals that carry digital data streams representing various types of information including, for example, instructions or data.

Basic Software System

Figure 7:
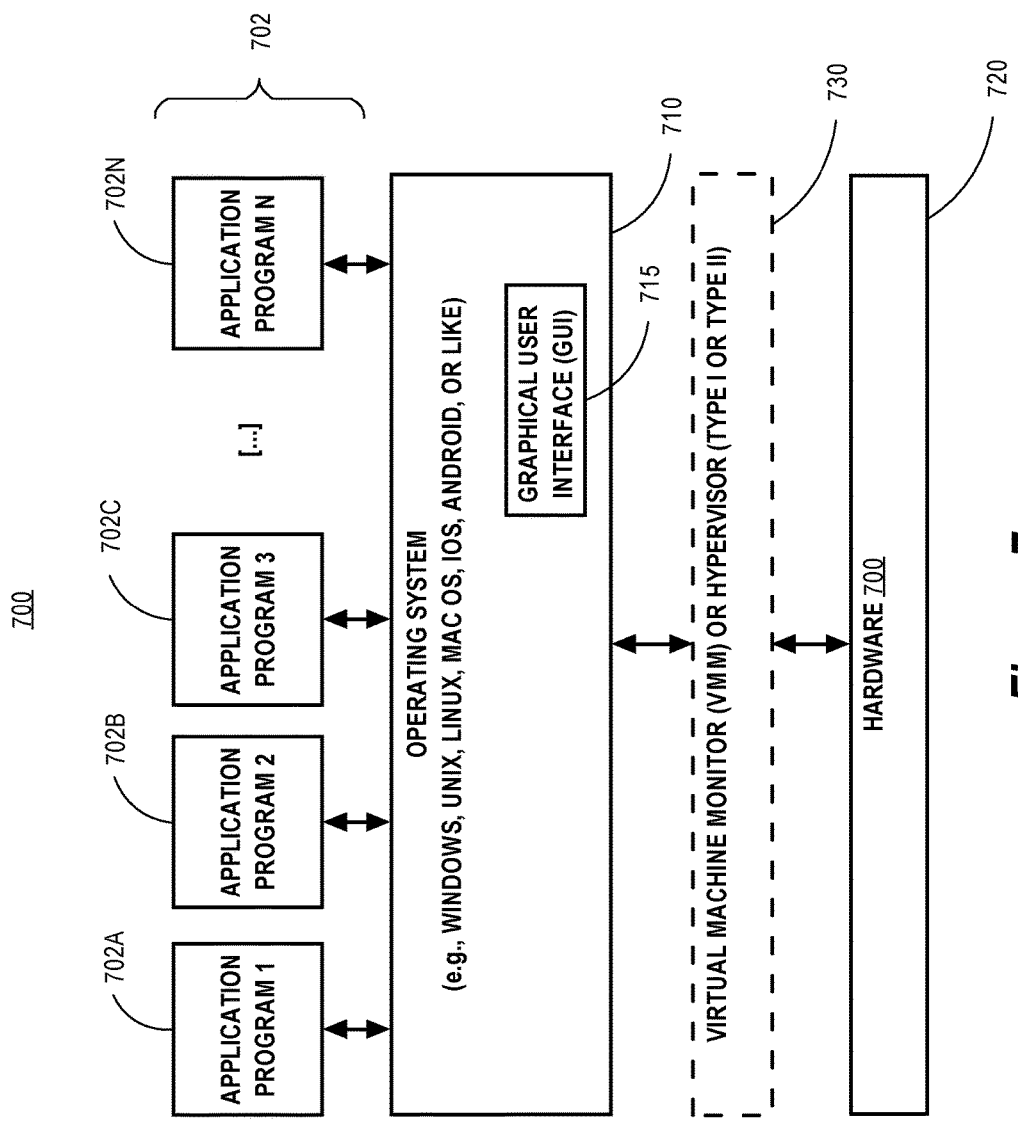
FIG. 7 is a schematic representation of a basic software system that may be employed for controlling the operation of basic computer hardware.

FIG. 7 is a schematic representation of a basic software system 700 that may be employed for controlling the operation of basic computer hardware such as, for example, hardware 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of hardware 600. Software system 700, which may be stored in main memory (RAM) 606 and on fixed storage (e.g., hard disk or flash memory) 610, includes a kernel or operating system (OS) 710.

The OS 710 manages low-level aspects of hardware operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution on the system 700. The applications or other software intended for use on system 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 600. Alternatively, a hypervisor or virtual machine monitor (VMM) 730 may be interposed between the hardware 600 and the OS 710. In this configuration, VMM 730 acts as a software "cushion" or virtualization layer between the OS 710 and the hardware 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the hardware 600 directly. In these instances, the same version of the guest operating system configured to execute on the hardware 600 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the some embodiments. The some embodiments, however, are not necessarily limited to any particular computing environment or computing device configuration. Instead, the some embodiments may be implemented in any type of system architecture or processing environment that one skilled in the art, in light of this disclosure, would understand as capable of supporting the features and functions of the some embodiments presented herein.

Extensions and Alternatives

In the foregoing specification, the some embodiments of the present invention have been described with reference to numerous specific details. However, the details may vary from implementation to implementation according to the requirements of the particular implement at hand. The some embodiments are, accordingly, to be regarded in an illustrative rather than a restrictive sense.

The invention claimed is:

1. A method for consistent cross-platform text layout performed at a client, comprising one or more processors and memory storing one or more sets of instructions executed by the one or more processors to perform the method, the method comprising:
generating text layout information representing a layout of text on a scalable unit grid;
wherein the scalable unit grid is based on a nominal display screen resolution-independent unit;
wherein the nominal display screen-resolution independent unit is based on an em size of a digital font face selected for the text;
wherein the text layout information comprises glyph information for each glyph in a set of glyphs;
wherein the glyph information for each glyph in the set of glyphs comprises a) vector path information defining one or more contours of the each glyph, and b) a horizontal grid coordinate and a vertical grid coordinate identifying a location of the each glyph in the scalable unit grid;
using the text layout information at the client to render the set of glyphs at the client in a first pixel grid; and
sending the text layout information over a network to a server-side rendering engine supported on one or more servers for rendering the set of glyphs in a second pixel grid.

2. The method of claim 1, wherein the first pixel grid has a first resolution; wherein the second pixel grid has a second resolution; and wherein the first resolution and the second resolution are different.

3. The method of claim 1, wherein sending the text layout information over a network to the server-side rendering engine comprises sending the text layout information over a network in a serialized data format.

4. The method of claim 3, wherein the serialized data format is JavaScript Object Notation (JSON) or eXtensible Markup Language (XML).

5. The method of claim 1, further comprising:
using the text layout information to render the set of glyphs at the client in a preview of a target product.

6. The method of claim 5, wherein the target product is a physical article.

7. The method of claim 5, wherein the target product is a digital product.

8. The method of claim 1, further comprising providing the text layout information to a client-side rendering engine by passing a pointer or reference to a data structure stored in the memory of the client, the data structure comprising the text layout information.

9. The method of claim 1, wherein the vector path information for each glyph in the set of glyphs comprises one or more Scalable Vector Path (SVG) path elements defining the one or more contours of the each glyph.

10. The method of claim 1, wherein each of the one or more contours of each glyph in the set of one or more glyphs is defined in the vector path information for the each glyph as a line or a Bezier curve.

11. A method for consistent cross-platform text layout performed at one or more servers comprising one or more processors and memory storing one or more sets of instructions executed by the one or more processors to perform the method, the method comprising:
receiving text layout information over a network from a client, the text layout information representing a layout of text on a scalable unit grid;
wherein the scalable unit grid is based on a nominal display screen resolution-independent unit;
wherein the nominal display screen-resolution independent unit is based on an em size of a digital font face selected for the text;
wherein the text layout information comprises glyph information for each glyph in a set of glyphs;
wherein the glyph information for each glyph in the set of glyphs comprises a) vector path information defining one or more contours of the each glyph, and b) a horizontal grid coordinate and a vertical grid coordinate identifying a location of the each glyph in the scalable unit grid; and
using the text layout information to render the set of glyphs in a pixel grid.

12. The method of claim 11, further comprising receiving the text layout information over a network from the client in a serialized data format.

13. The method of claim 12, wherein the serialized data format is JavaScript Object Notation (JSON) or eXtensible Markup Language (XML).

14. The method of claim 11, further comprising using the text layout information to render the set of glyphs in or on a target product.

15. The method of claim 14, wherein the target product is a digital product; and wherein the method comprises using the text layout information to render the set of glyphs in the digital product.

16. The method of claim 15, wherein the digital product is a digital image, a digital video, or a digital document.

17. The method of claim 14, wherein the target product is a physical article; and wherein the method comprises using the text layout information to render the set of glyphs on the physical article.

18. The method of claim 17, wherein using the text layout information to render the set of glyphs on the physical article comprises:
rendering the set of glyphs to a pixel image; and
printing the pixel image on the physical article.

19. The method of claim 17, wherein the physical article is an article of clothing.

20. A system comprising:
one or more processors;
storage media;
one or more programs stored in the storage media and configured for execution by the one or more processors, the one or more programs comprising instructions for:
generating text layout information representing a layout of text on a scalable unit grid;
wherein the scalable unit grid is based on a nominal display screen resolution-independent unit;
wherein the nominal display screen-resolution independent unit is based on an em size of a digital font face selected for the text;
wherein the text layout information comprises glyph information for each glyph in a set of glyphs;
wherein the glyph information for each glyph in the set of glyphs comprises a) vector path information defining one or more contours of the each glyph, and b) a horizontal grid coordinate and a vertical grid coordinate identifying a location of the each glyph in the scalable unit grid;
using the text layout information to render the set of glyphs in a first pixel grid; and
sending the text layout information over a network to a computing system supported on one or more computing devices for rendering the set of glyphs in a second pixel grid.

21. A system comprising:
one or more processors;
storage media; and
one or more programs stored in the storage media and configured for execution by the one or more processors, the one or more programs comprising instructions for:
obtaining text layout information representing a layout of text on a scalable unit grid;
wherein the scalable unit grid is based on a nominal display screen resolution-independent unit;
wherein the nominal display screen-resolution independent unit is based on an em size of a digital font face selected for the text;
wherein the text layout information comprises glyph information for each glyph in a set of glyphs;
wherein the glyph information for each glyph in the set of glyphs comprises a) vector path information defining one or more contours of the each glyph, and b) a horizontal grid coordinate and a vertical grid coordinate identifying a location of the each glyph in the scalable unit grid;
using the text layout information to render the set of glyphs in a first pixel grid; and
sending the text layout information over a network to a computing system supported on one or more computing devices for rendering the set of glyphs in a second pixel grid.

\* \* \* \* \*